Patented Dec. 11, 1928.

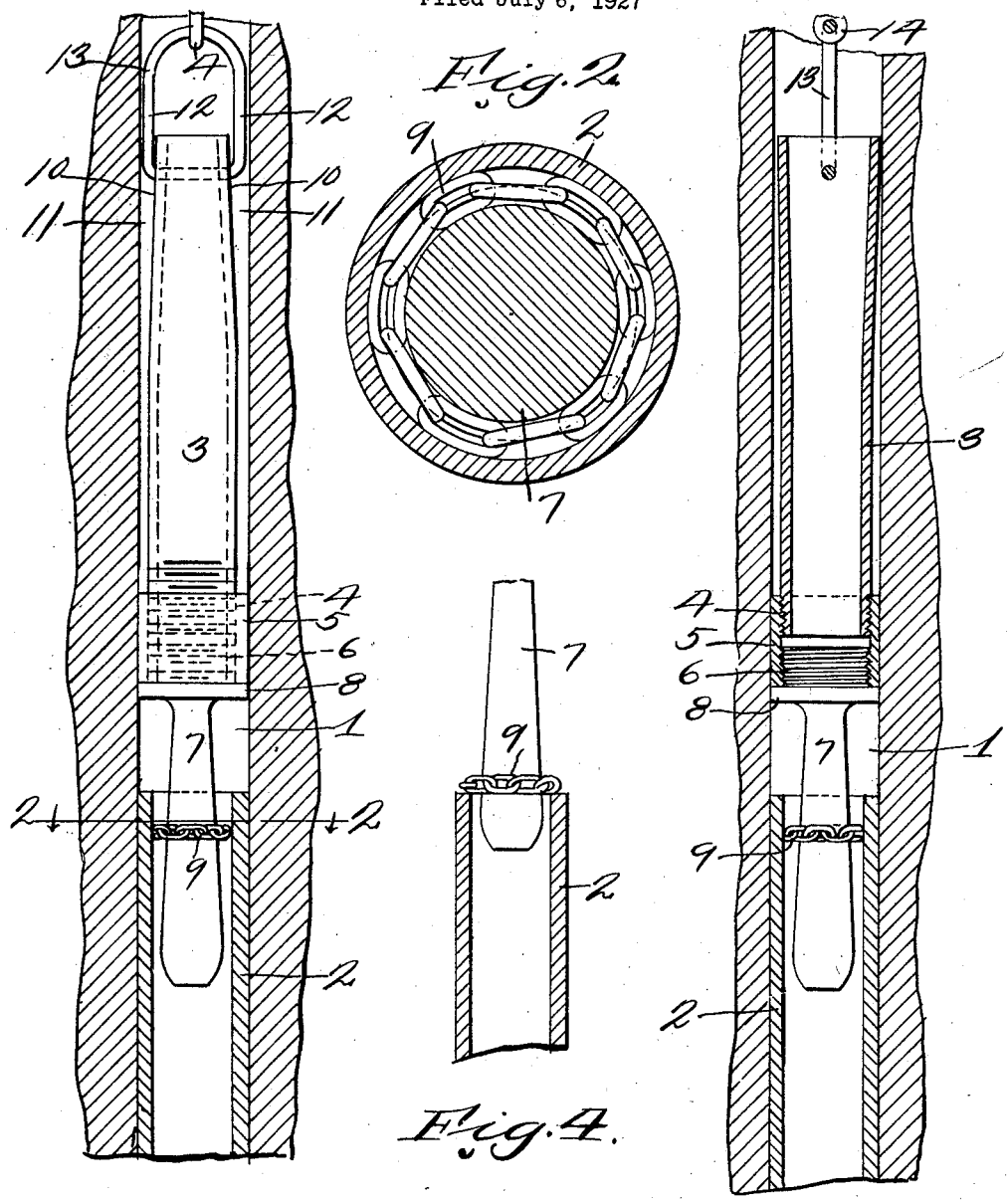

1,694,953

UNITED STATES PATENT OFFICE.

SAMUEL K. SMOOT, OF FLOMOT, TEXAS, ASSIGNOR OF ONE-HALF TO W. F. ALLEN AND HARMON MOSELY, BOTH OF FLOMOT, TEXAS.

PIPE-PULLING DEVICE.

Application filed July 6, 1927. Serial No. 203,711.

The invention relates to pipe pulling devices and has for its object to provide a device of this character adapted to be lowered into a well hole or other boring and having its lower end provided with an upwardly tapered member, around which a linked member extends which is of smaller interior diameter than the diameter of the widest portion of the tapered member whereby it will be maintained on the tapered member, and which linked member contracts as the tapered member passes into a pipe end and expands and grips the inner periphery of the pipe end upon an upward movement of the tapered member.

A further object is to provide the upper end of the tapered member with a threaded head having a sleeve, and into which sleeve is threaded a pipe section having its upper end flattened and provided with a loop, the flattened end of the pipe section allows the loop arms to move downwardly and upwardly in the boring, without jamming.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical sectional view through a portion of a pipe and well hole, showing the device in side elevation.

Figure 2 is a horizontal sectional view through the pipe and device taken on line 2—2 of Figure 1.

Figure 3 is a vertical transverse sectional view through the pipe pulling device, well and pipe section.

Figure 4 is a side elevation of a portion of the pipe pulling device, showing the tapered member entering the pipe section.

Referring to the drawing, the numeral 1 designates a well and 2 a pipe section therein which it is desired to pull out of the well. The pipe pulling device comprises a cylindrical pipe section 3, the lower end of which is threaded at 4 into a coupling 5, and threaded into the lower end of the coupling is the reduced threaded portion 6 of an upwardly tapered extension 7, and which extension is adapted to enter the upper end of the pipe section 2 when lowered into the well 1. The upper end of the tapered member 7 is preferably provided with an annular flange 8, which engages the lower end of the coupling 5. By providing the coupling and forming the device in sections, it is obvious it can be cheaply manufactured and easily assembled or disassembled as desired.

Surrounding the tapered member 7 is a linked annular member 9 having an interior diameter less than the extreme diameter of the tapered member 7 whereby the linked member may move downwardly on the tapered member but can not come off of said member, as clearly shown in Figure 4. In use, the device is lowered into the well 1, and moves downwardly until the linked member 9 engages the upper end of the pipe section 2, as clearly shown in Figure 4, and as the tapered member 7 continues its downward movement, the linked member 9 will contract, and incident to its linked construction, will drop into the end of the pipe 2 to a position whereby upon an upward movement of the pipe pulling device, the linked member will be expanded, and its links forced into close binding engagement with the inner periphery of the pipe section 2, incident to the tapered shape of the extension 7, therefore it will be seen that the device will grip the pipe section 2, and upon the continued upward movement of the pipe pulling device, said pipe section will be pulled from the well.

The upper end of the pipe section 3 is flattened as shown in Figures 1 and 3 at 10, thereby providing a relatively large space 11 between the flattened portions for allowing a free upward and downward movement of the loop 13, to which a rope 14 may be attached, thereby allowing the use of a relatively large pipe section for providing the necessary weight for insuring a positive downward movement of the device when lowered into a well.

From the above it will be seen that a pipe pulling device is provided, which is simple in construction and one wherein a contractible linked member is used around a tapered wedging member, and said contractible linked member will provide a plurality of bearing engagements with the inner periphery of the pipe section and the periphery of the tapered member extending entirely around the same, thereby insuring an accurate guiding of the pipe section without tilting and also maintains the pipe pulling device in axial relation to the pipe section at all times.

The invention having been set forth what is claimed as new and useful is:—

1. A pipe pulling device comprising a body member, a tapered extension carried by said body member and a contractible linked member surrounding the tapered member and having an interior diameter less than the extreme diameter of the tapered member.

2. A pipe pulling device comprising a tubular body member, a coupling threaded on one end of said tubular body member, a head threaded into said coupling, a tapered extension carried by said head and tapering towards the head, and a linked flexible member surrounding the tapered member and having an interior diameter less than the extreme diameter of the tapered member.

In testimony whereof I hereunto affix my signature.

SAMUEL K. SMOOT.